Figure 1:
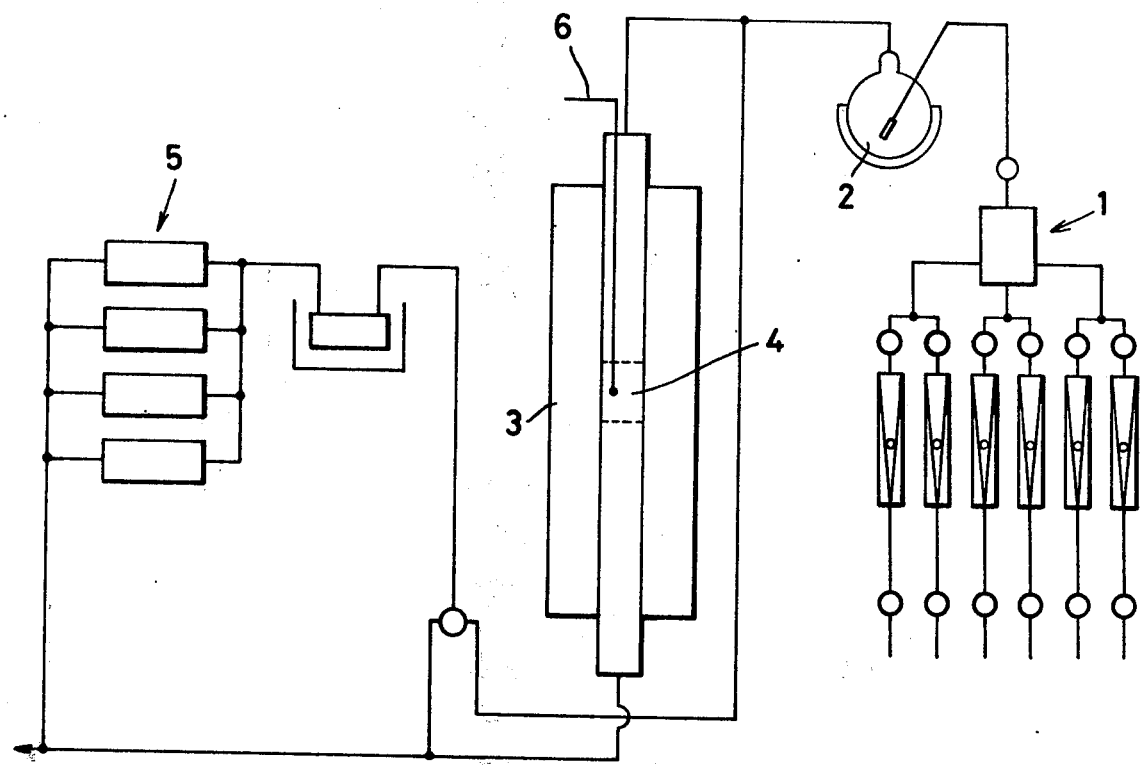

United States Patent [19]

Hayashi et al.

[11] 4,116,884
[45] Sep. 26, 1978

[54] OXIDIZING CATALYZER

[75] Inventors: Tadayoshi Hayashi, Niiza; Yoshiaki Takagi, Kawagoe; Tetsuo Toizume, Takatsuki; Masakazu Umeda, Nara, all of Japan

[73] Assignee: Honda Giken Kogyo Kabushiki Kaisha, Tokyo, Japan

[21] Appl. No.: 821,282

[22] Filed: Aug. 2, 1977

[30] Foreign Application Priority Data

Aug. 6, 1976 [JP] Japan .................................. 51-93138

[51] Int. Cl.$^2$ .................... B01J 23/72; B01J 23/86; B01J 21/04; B01J 21/06
[52] U.S. Cl. .................................. 252/470; 252/458; 252/459; 252/462; 252/465; 252/466 J; 252/468; 252/469; 252/473; 252/474; 75/159; 75/170; 75/171; 423/213.5

[58] Field of Search .................... 252/459, 462, 466 J, 252/470, 472, 473, 474, 458, 465, 468, 469; 75/159, 170, 171; 423/213.5

[56] References Cited

U.S. PATENT DOCUMENTS

| 1,954,102 | 4/1934 | Roseby ............................. 75/170 X |
| 3,928,235 | 12/1975 | Goodell ........................... 252/470 X |
| 3,978,005 | 8/1976 | Kawagoshi et al. ................ 252/470 |

FOREIGN PATENT DOCUMENTS 2,161,623  6/1973  Fed. Rep. of Germany ........... 252/470

*Primary Examiner*—W. J. Shine
*Attorney, Agent, or Firm*—Haseltine, Lake & Waters

[57] ABSTRACT

Catalyst systems for oxidizing carbon monoxide and hydrocarbon gases are described. These catalyst systems may be incorporated into catalyzers for use in oxidizing waste or exhaust carbon monoxide and unburned hydrocarbon gases emanating from internal combustion engines.

5 Claims, 14 Drawing Figures

OXIDIZING CATALYZER

DETAILED EXPLANATION OF INVENTION

This invention relates to a useful and novel oxidizing catalyst used for oxidizing carbon monoxide and unburned hydrocarbons by contact with said catalyst. This is particularly useful in oxidizing carbon monoxide and unburned hydrocarbon in the exhaust or waste gas of an internal combustion engine or the like, and thus rendering these materials non-poisonous.

Recently, it has been known to use an oxidizing catalyst to remove carbon monoxide (CO) and hydrocarbons (HC) contained in a combustion gas generated from a combustion engine such as an internal combustion engine or the like so that the exhaust gas may be purified.

As examples of oxidizing catalysts used, for instance, for purifying the waste gas of a motorcar, there has been generally used such a type of catalyst in association with a ceramic carrier such as alumina, cordierite or the like which is coated with a noble metal as platinum, palladium or the like.

This conventional catalyst, however, involves problems such as brittleness in strength caused by using the ceramic carrier, complications in the process steps of manufacturing diversity of products derived from the complications of the manufacturing process, and sources for the noble metals. Additionally, other inconveniences, such as when the catalyst is used in a two-stroke engine which discharges a large amount of HC, a remarkable temperature rise, resulting from the heat of reaction, is effected and rapid deterioration of the catalyst activity is brought about and the initial purification ability thereof cannot, therefore, be maintained.

As examples of oxidizing catalysts comprising base metals, it has been disclosed in U.S. Pat. No. 3,565,574 that SUS 347 (18% Cr, 9.0%Ni, 0.08% C, 2% Mn, 0.05% P, 0.03% S, 1% Si, the remainder Fe) is very excellent as an oxidizing catalyst for CO and HC. However, this catalyst is good for oxidizing about 70% in CO, (purification rate), but is relatively poor in that only about 30% in HC (purification rate), at 600° C, is oxidized and thus the prior art catalyst is practically inefficient in its ability as an oxidizing catalyst and cannot meet recent strict effluent gas emmission standards. Additionally, the inventors of the present invention have measured the HC purification rate in respect to a Monel metal (66% Ni, 31.5% Cu and impurities) which is described in the above specification (i.e., U.S. Pat. No. 3,565,574) as an effective reducing catalyst and have determined that the same is so poor that only 15–20% at 600° C is effected, thus reducing the purification rate and is therefore entirely unsuitable as an oxidizing catalyst.

In this Ni-Cu alloy, it can be expected that the purification rate of HC is improved by increasing the amount of Cu, but it has been found that the purification rate reaches only such a poor level of about 25% even if the alloy is one of 42% Ni–58% Cu. In addition, the alloy of Ni-Cu is bad in oxidation resisting property and has a problem in respect of its durability even when it is used as a reducing catalyst, and also has such a tendency, when used as an oxidizing catalyst, that the life thereof is shorter, and is thus deteriorated in a very short time even if used as a catalyst for purifying waste gas of motorcars or the like.

The present invention has an object to provide a novel alloy of nickel-cobalt series as an oxidizing catalyst which is free from the foregoing defects of the conventional catalysts and is high in purification ability of both CO and HC, and it is characterized in that the catalyst comprises a binary alloy of Ni-Co or a ternary alloy of Ni-Co-Cr or Ni-Co-Cu. Another feature of this invention is to provide an oxidizing catalyst of this kind whereby the CO purification rate or percentage of about 80% or more, and the HC purification rate or percentage of about 40% or more can be effected, and it is characterized in that the binary alloy comprises 75–40% Ni and 25–60% Co.

Another feature of this invention is to provide an oxidizing catalyst of this kind whereby the HC purification rate of 50% or more can be obtained steadily, and it is characterized in that the binary alloy comprises 75–45% Ni and 30–55% Co.

Another feature of this invention is to provide an oxidizing catalyst of this kind which is improved in oxidation resistant property and is excellent in durability or life use, and it is characterized in that, in the binary alloy of 75–40% Ni and 25–60% Co, at least one element selected from a group of Al, Si, Nb, Ti, Be and RE (Rare Earth elements) is contained therein in the amount of 0.5–3.5%.

Another feature of this invention is to provide an oxidizing catalyst of this kind which affords lower manufacturing cost, is improved in strength at high temperature, and can be used in the form of a single plate, and it is characterized in that the ternary alloy comprises 70–45% Ni, 30–55% Co and 0.5–12.5% Cr.

Another feature of this invention is to provide an oxidizing catalyst whereby the HC purification rate of 50% or more can be effected assuredly and it is characterized in that the ternary alloy comprises 70–45% Ni, 30–55% Co and 0.5–10% Cr.

Another feature of this invention is to provide an oxidizing catalyst of the ternary alloy Ni-Co-Cr which is high in oxidation resisting properties and it is characterized in that the ternary alloy contains in the amount of 0.5–3.5% of at least one element selected from the group of Al, Si, Nb, Ti, Be and RE.

Another feature of this invention is to provide an oxidizing catalyst which is decreased in the amount of Co used and has a large purification ability of CO and HC, and it is characterized in that the ternary alloy of Ni-Co-Cu has any desired composition within a range surrounded by points I, J, K, L, M, N, O and P shown in a diagram of triangular coordinates shown in FIG. 6.

Another feature of this invention is to provide an oxidizing catalyst of this kind which can steadily effect the HC purification rate of 50% or more and it is characterized in that the ternary alloy of Ni-Co-Cu has any composition ratio within a range surrounded by points A, B, C, D, E, F, G and H shown in a diagram of triangular coordinates shown in FIG. 6.

Another feature of this invention is to provide an oxidizing catalyst of Ni-Co-Cu alloy which is excellent in oxidation preventing properties, and it is characterized in that, in the ternary alloy of Ni-Co-Cu of which the composition is within the range surrounded by the points I, J, K, L, M, N, O and P in the diagram of FIG. 6 at least one element selected from a group of Al, Si, Nb, Ti, Be and RE is contained therein in the amount of 0.5–3.5%.

Before explaining the details of the properties of the oxidizing catalyst of this invention, measurement of the oxidizing catalyst properties used in this invention will be explained as follows:

FIG. 1 shows a catalyzer activation testing apparatus used in a purification rate test of an oxidizing catalyst alloy of this invention. A gaseous mixture having the same composition as an exhaust gas actually generated by an existing internal combustion engine of a motor car is prepared by a gas mixture — adjusting device 1, and the generated gaseous mixture gas is allowed to flow into a heating furnace 3 through a moisture adding device 2, and thus the gaseous mixture is passed therethrough so as to come in contact with a sample catalyst 4 which has been previously charged in the heating furnace 3 and heated to a predetermined temperature. The gas is then measured as to the respective component gases thereof such as CO, HC and other gases by a gas analyzer 5 so that the respective purification rates thereof may be obtained. Numeral 6 denotes a thermocouple which is in contact with the sample catalyzer 4.

The SUS 347 alloy catalyst disclosed in the earlier mentioned U.S. Patent specification was tested by this apparatus, whereby the respective purification rates for CO and HC were measured. The results thereof are as shown by curve S in both FIGS. 2 and 3.

Figure 2:
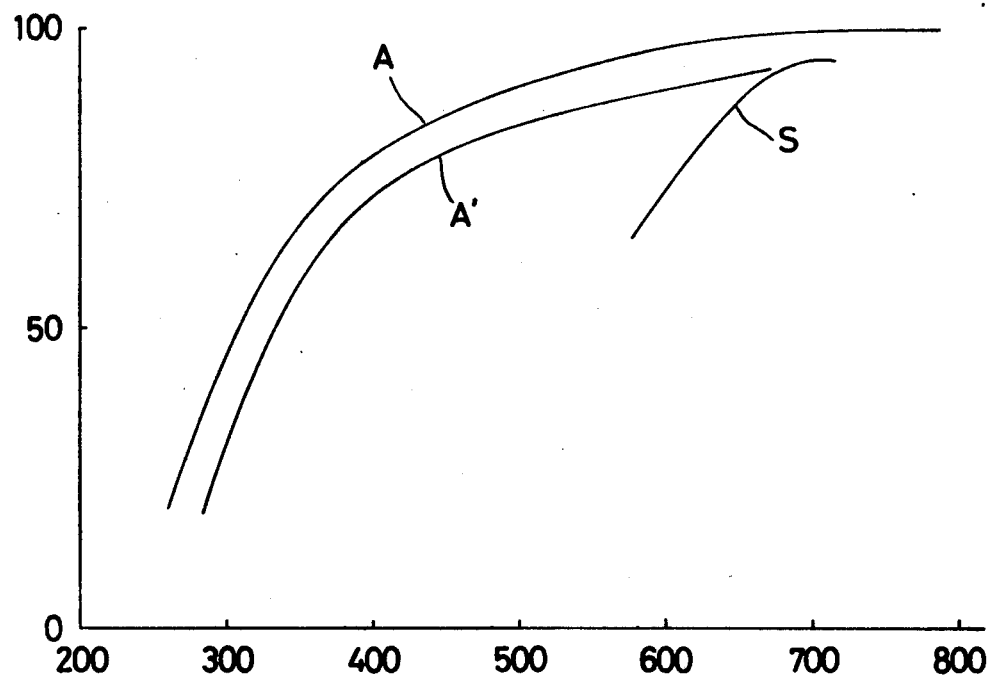
Figure 3:
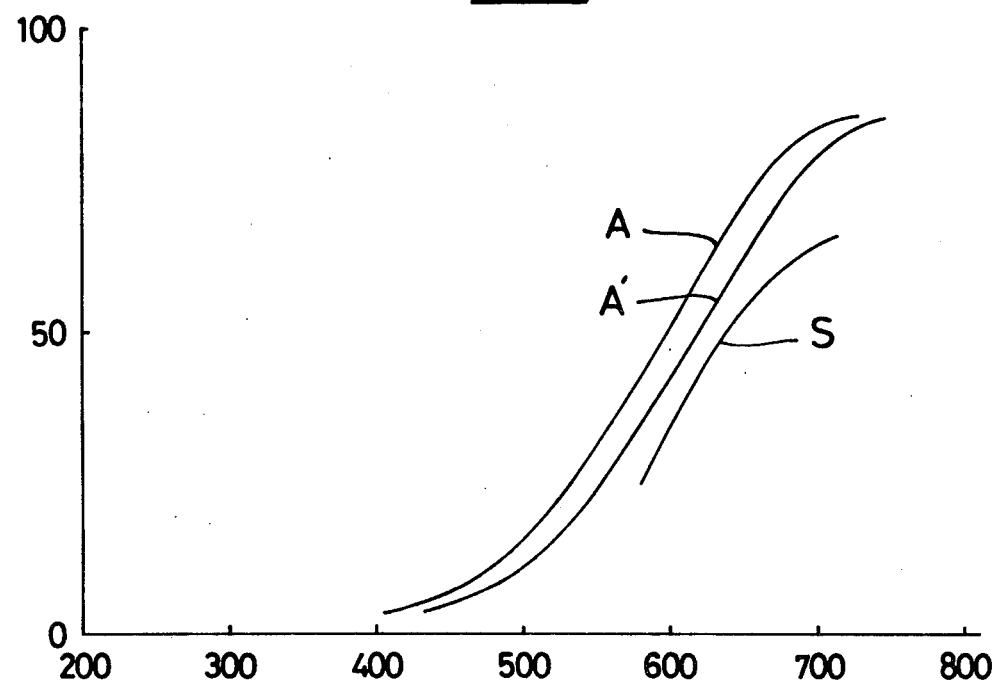

On the other hand, all of the Ni-Co, the Ni-Co-Cr and the Ni-Co-Cu catalysts of the foregoing elucidated compositions according to the present invention have exhibited such purification rates falling in a range of curves A — A' in FIGS. 2 and 3 and are much more efficient than the SUS 347 catalyst alloy.

It has been found that the catalyst alloy of this invention exhibits, at a catalyst temperature of about 600° C, a CO purification rate above 80% and also exhibits an HC purification rate at a high value of about 40% to 50%, and is very effective for practical use even at comparatively low temperatures.

In the explanation of this invention made hereinafter, the HC purification rate obtained at 600° C is illustrated so as to generally represent a catalyst property of the alloy of this invention.

Figure 4:
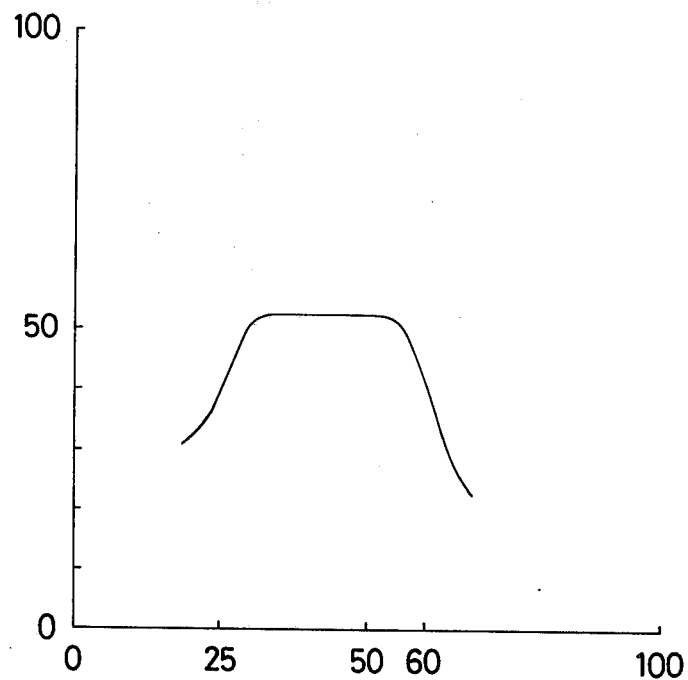

FIG. 4 shows a relation, in the binary alloy of Ni-Co, between the ratio of the amount of Co (thus defining the ratio of Ni in said catalyst) and HC purification rate. The purification rate becomes about 40% to 50% or more within a range of from 25% to 60% of Co thereof, and the HC purification rate reaches a high and steady value of 50% especially within a range of from 30% to 55% of Co. If the HC purification rate of 30% at 600° C is considered to be a good standard as in the case of the foregoing U.S. patent SUS 347, it would be enough when the amount of Co is 20% or 65%, but from the practical view point the HC purification rate at 600° C has to be at least 35% and near 40%, and therefore the range of the Co amount of from 25% to 60% as mentioned before becomes essential.

Figure 5:
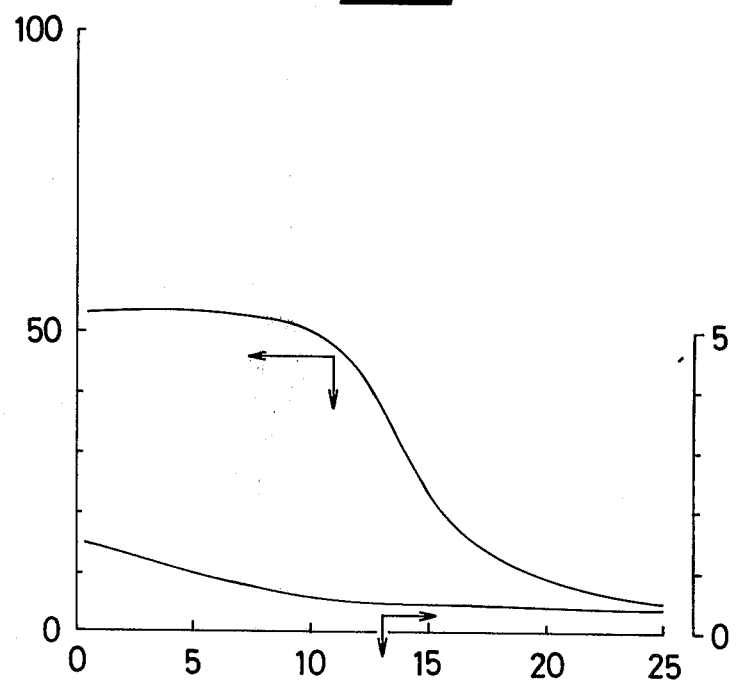

Next, according to this invention, an oxidizing catalyst can be obtained which has a predetermined catalyst property, is lowered in cost and is improved in strength at a high temperature and can be used even in the form of a single plate as a catalyzer. Namely, many tests have been carried out with respect to the ternary alloy of Ni-Co-Cr, and as a result thereof it has been found that when a part of 30-55% Co or of 70-45% Ni is replaced by Cr, and where the amount of Cr is increased, as shown in FIG. 5, the purification rate of HC of 50% or more is maintained by the addition of 10% or less of Cr and the purification rate of HC of 40% or more is maintained with the amount of 0.5-12.5% Cr. Thus, it is clear that an oxidizing catalyst which is similarly effective can be obtained even if Cr is added to the binary alloy in a predetermined amount. Additionally, it has been found that the foregoing added amount of Cr acts to decrease the amount by oxidation of the catalyst, and accordingly the binary alloy catalyst of Ni-Co can be improved in its oxidation resisting properties.

Additionally, according to this invention, there can be obtained in oxidizing catalyst composed of a ternary alloy of Ni-Co-Cu that the amount of Ni, Co, especially that of Co which is used can be extremely conserved and an extremely low cost product can be obtained. Additionally, the amount of Ni used can be increased more than in the case of the binary alloy of Ni-Co and yet the oxidizing ability of the catalyst, is excellent. Namely, in the case when the ternary alloy is formed into any composition of three component ratios composed within a range encompassed by points I, J, K, L, M, N, O and P of the diagram of triangular coordinates shown in FIG. 6, there can be obtained a product having a purification ability wherein the HC purification rate is above 40%. Above all, if the catalyst is formed of any composition of three component ratios composed within a range surrounded by points A, B, C, D, E, F, G and H within the foregoing range, there can be obtained a product having, without fail, the HC purification rate of 50% or more.

Here, the coordinate positions of the respective points as mentioned before are as follows:

| POINT | Ni % | Co % | Cu % |
|---|---|---|---|
| A | 70 | 30 | — |
| B | 63 | 30 | 7 |
| C | 80 | 13 | 7 |
| D | 80 | 5 | 15 |
| E | 45 | 5 | 50 |
| F | 30 | 20 | 50 |
| G | 30 | 55 | 15 |
| H | 45 | 55 | — |
| I | 75 | 25 | — |
| J | 70 | 25 | 5 |
| K | 85 | 10 | 5 |
| L | 85 | 3 | 12 |
| M | 37 | 3 | 60 |
| N | 25 | 15 | 60 |
| O | 25 | 60 | 15 |
| P | 40 | 60 | — |

In other words, the range surrounded by the foregoing points I, J, K, L, M, N, O and P comprises a composition area range $a$ of 25–75% Ni, 25–60% Co, and Cu≦50% and a composition area range $b$ of 25–85% Ni, 3–25% Co and 5–60% Cu.

The range surrounded by the points A, B, C, D, E, F, G and H comprises a composition area range of 30–70% Ni, 30–55% Co and Cu≦40% (a lattice pattern area within $a$) and a composition area range of 30–80% Ni, 50–30% Co and 7–50% Cu (a lattice pattern area within $b$).

As will be clear from the above, the range of the amounts of Ni and Co can be expanded by adding Cu, and the amount of Co used can be decreased to 3% as compared with the case of the binary Ni-Co alloy. It thus becomes possible to make the product at a lower cost.

Figure 7:
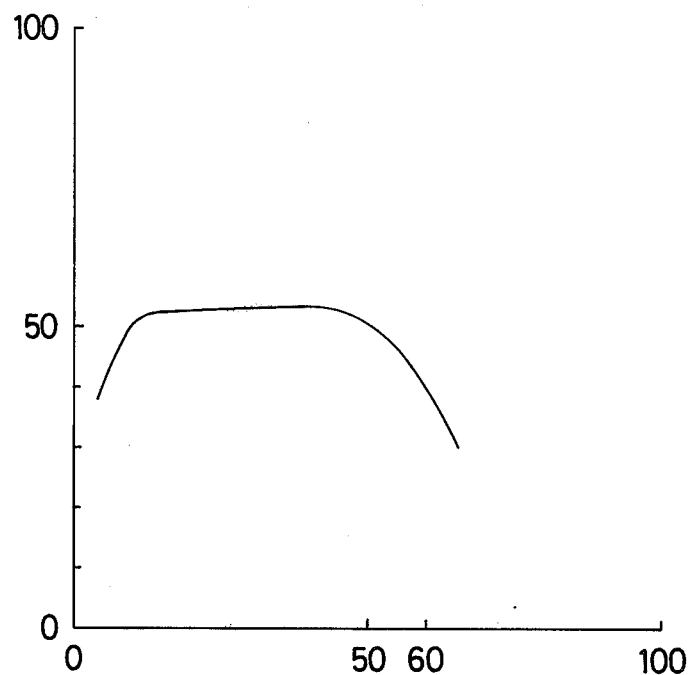
Figure 8:
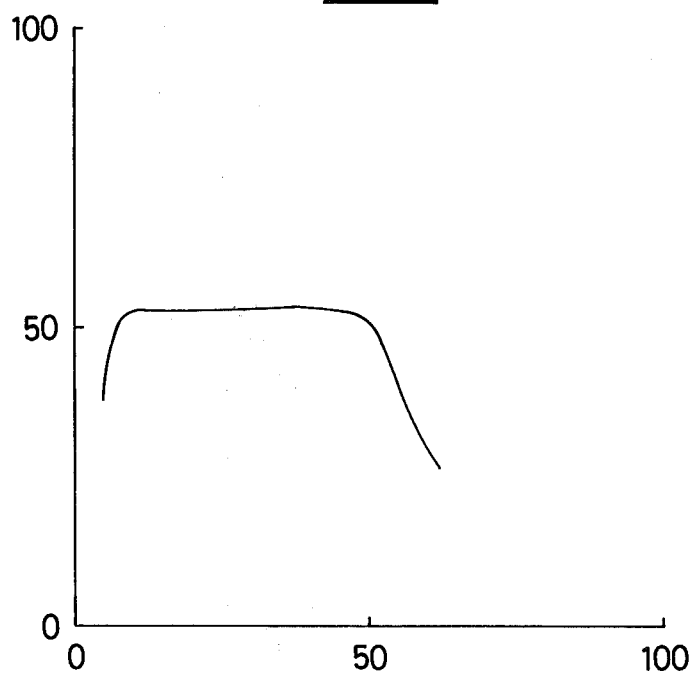

FIG. 7 shows a relation between the amount of Cu added and the HC purification rate in the case where the Co amount is 10%. It can be seen therefrom that the purification rate of from 40% to 50% or more is exhibited with the range of the Cu amount added is from 5% to 60%, and the steady or assured purification rate of 50% or more is obtained especially with the Cu range of amount added is above about 10% to 50%.

Figure 8:
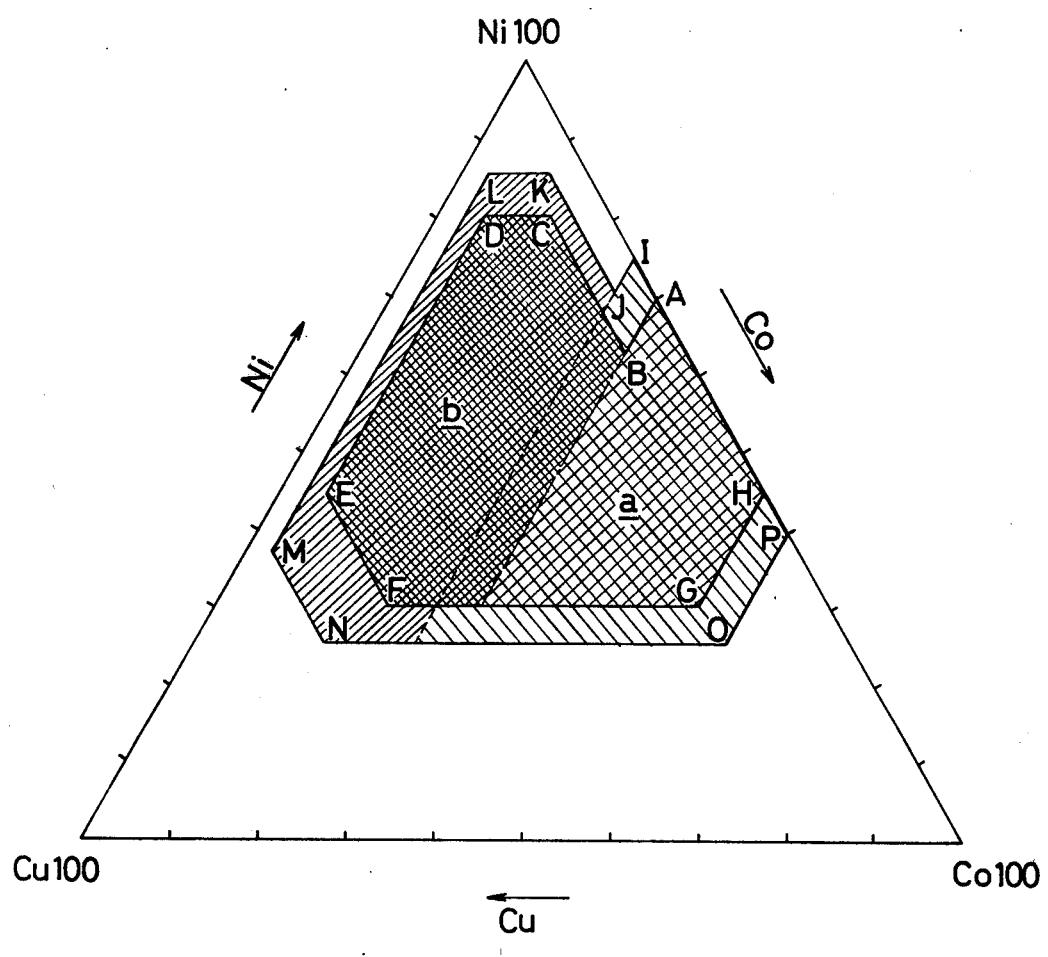

FIG. 8 shows a relation between the amount of Cu added and the HC purification rate in the case where the amount of Co added is 20%. The purification rate of from 40% to 50% or more is exhibited within the range of amount of Cu added is from 5% to about 55%, and the stable purification rate of 50% or more is exhibited especially with the amount of Cu added is from 7% to 50%.

Figure 9:
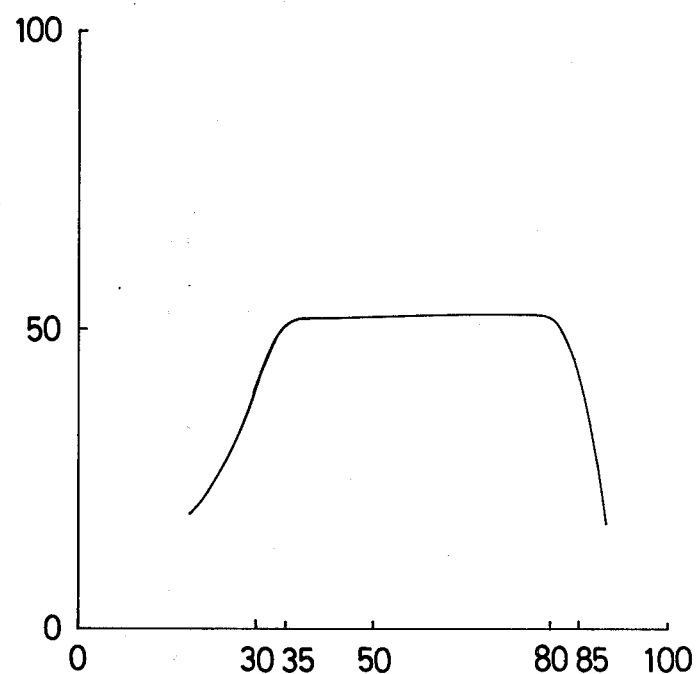

FIG. 9 shows the relation between the amount of Ni added and the HC purification rate in the case where the amount of Cu added is 10%. The purification rate of from about 40% to 50% and more is effected with the range of Ni amount added is between 30% to 85%, and the stable purification rate of about 50% is obtained especially with the amount of Ni added is from 35% to 80%.

Figure 10:
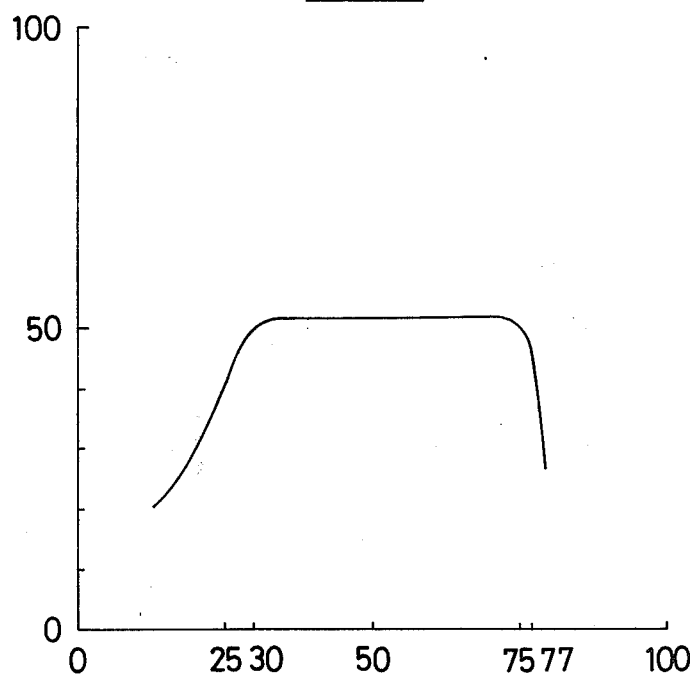

FIG. 10 shows a relationship between the amount of Ni added and the HC purification rate in the case where the amount of Cu added is 20%. It can be noticed therefrom that the purification rate of from 40% to 50% and more is obtained with the range of amount of Ni added is from 25% to 77%, and the stable purification rate of above 50% is obtained especially with the amount of Ni added is from 30% to 75%.

Thus, many experiments have been made by variably changing the composition ratios of the alloy Ni-Co-Cu, and consequently it has been found that the compositions within the foregoing ranges provide good catalyst properties.

Figure 11:
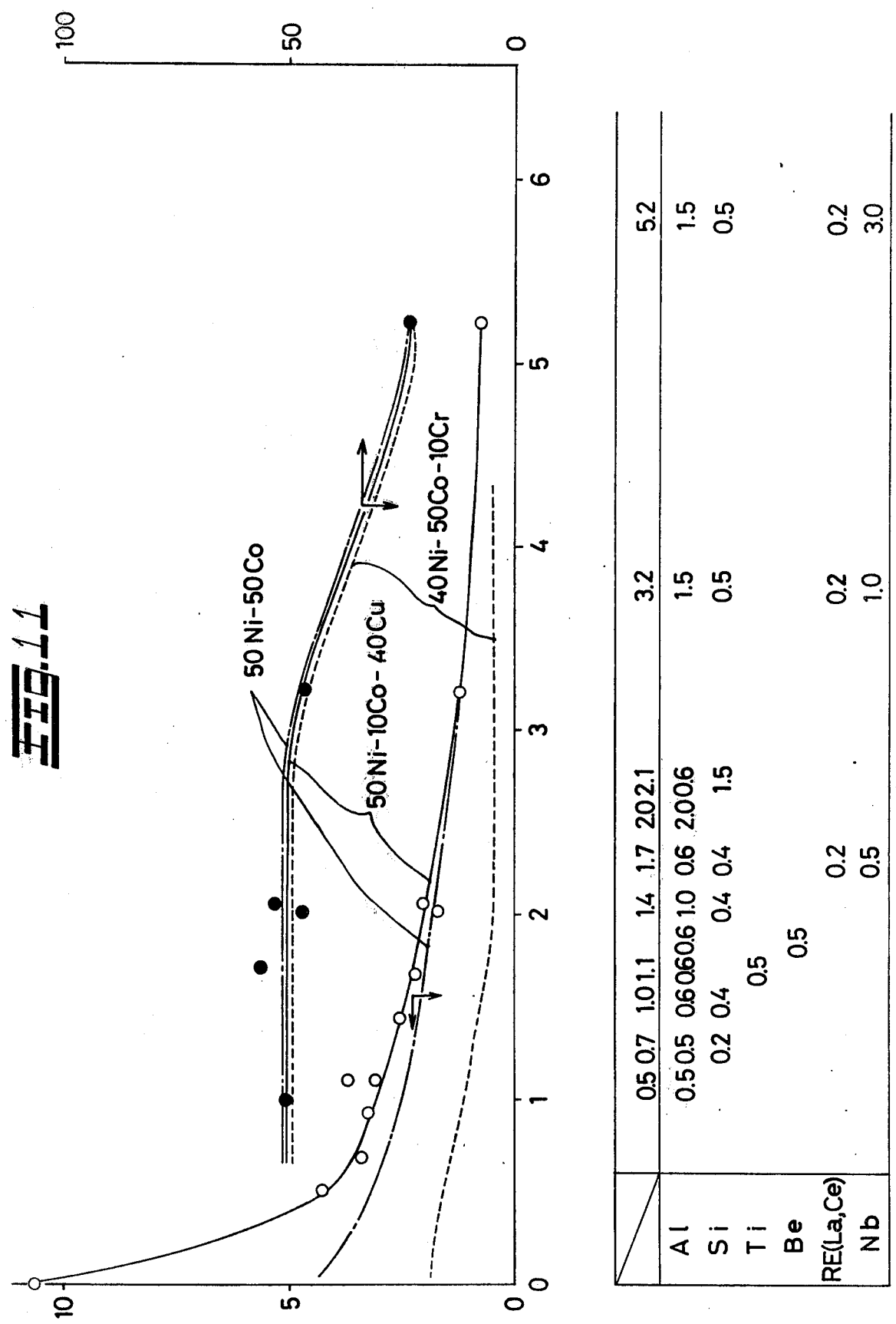

Additionally, repeated experiments for improving the oxidation resisting properties have been made in respect to the oxidizing catalyst alloy of this invention, and as a result thereof, it has been confirmed that the oxidation resisting properties can be improved if to the foregoing binary alloy of Ni-Co or the ternary alloy of Ni-Co-Cr or Ni-Co-Cu is added a small amount of an additive element by a predetermined amount. Namely, as shown in FIG. 11, if one, two or more of the elements Al, Nb, Ti, Be and RE (standing for Rare Earth elements) are added in a small amount to the alloy, oxidation of the alloy is extremely decreased and thus the oxidation properties are much improved when the addition amount of these elements added is 0.5% or more. If, however, the amount added exceeds 4%, the HC purification rate is obviously lowered to below 35%, which is not preferable. It has been confirmed that, especially with the addition amount thereof of 0.5–3.5%, the purification rate thereof can be kept substantially equal to that in the case of non-addition and at the same time the oxidation resisting properties of the catalyst can be improved.

GENERAL EXPLANATION OF DRAWING

Figure 13:
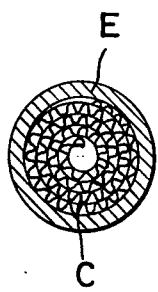
Figure 12:
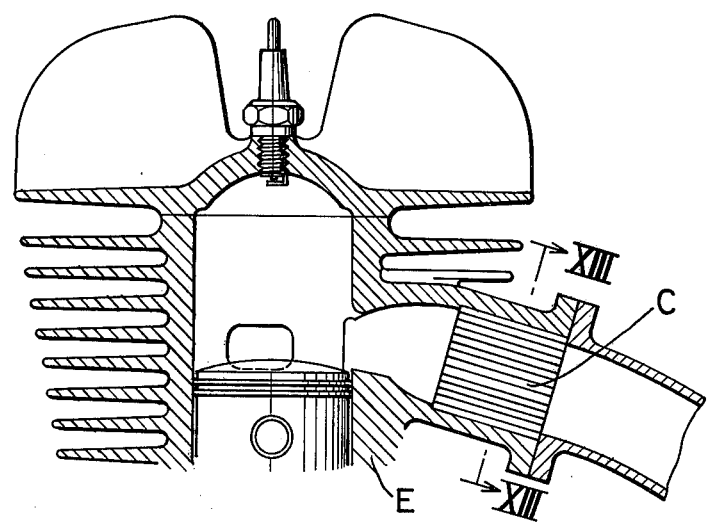
Figure 14:
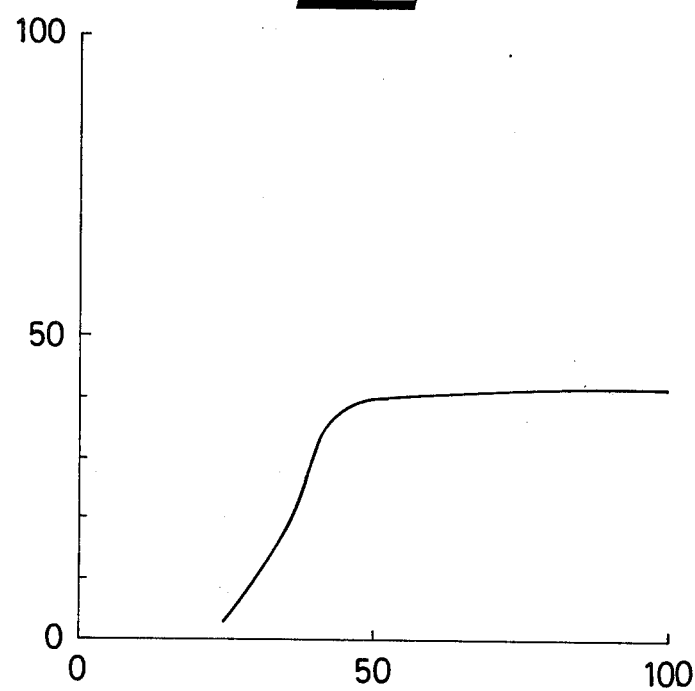

FIG. 1 is a diagram showing a catalyzer activation test apparatus,

FIGS. 2 and 3 are diagrams showing characteristic curves of CO purification rate and HC purification rate of the catalyzer of this invention, FIG. 4 is a diagram showing the relation between the amount of Co in a binary alloy of Ni-Co of this invention and the HC purification rate, FIG. 5 is a diagram showing the relationship of the amount of Cr in a ternary alloy of Ni-Co-Cr of this invention with the HC purification rate thereof and with increased amount by oxidation, FIG. 6 is a diagram of triangular coordinates of an oxidizing alloy catalyst of this invention of Ni-Co-Cu, FIG. 7 is a diagram showing the relation between the amount of Cr in the alloy of Ni-Co-Cu and the HC purification rate thereof, FIG. 8 is a diagram showing the relation between the amount of Cu in an alloy of Ni-Co-Cu and the HC purification rate thereof, FIG. 9 is a diagram showing the relation between the amount of Ni in the alloy of Ni-Co-Cu and the HC purification rate thereof, in the case where the Cu amount is 10%, FIG. 10 is a diagram showing the relation between the amount of Ni in an alloy of Ni-Co-Cu and the HC purification rate thereof, in the case where the Cu amount is 20%, FIG. 11 is a diagram showing the relation of the added amount of an additive with the amount of increase by oxidation of this invention's alloy catalyst and with the HC purification rate thereof, FIG. 12 is a sectional view of one embodying example wherein this invention catalyzer is applied to an internal combustion engine, FIG. 13 is a sectional view taken along the line XIII — XIII in FIG. 12 and FIG. 14 is a diagram showing the relation between the purification rate obtained by the LA-4 test and the purification rate obtained by the catalyzer activation test apparatus.

The percentages of the elements in the ternary alloy should be always made 100% in total.

To make 100% in total is applied to the case where the selected element is added.

When the catalyst of the invention in the form of a catalyzer is attached to a two-stroke engine and a HC purification test is carried out, the results thereof are as described as follows:

EXAMPLE 1

An alloy of 50% Ni-10% Co-39% Cu-0.6Al-0.4 Si is manufactured by melting raw materials thereof under vacuum, and thereafter the same is made in the form of a plate. A pair of such plates are joined onto the opposite surface of a core metal comprising a plate of an alloy of 80% Ni-20% Cr so that a plate material may be obtained. This is then formed into one 0.4mm in thickness by rolling and thereafter formed into a shaped body having a large number of waves. This is then wound into a spiral for obtaining a catalyzer C of this invention as shown in FIG. 13. The catalyzer C is subjected to a treatment, which is repeated three times, wherein the catalyst is oxidized in the atmosphere at 800° C for 1 hour and is then reduced in a hydrogen gas flow at 600° C for 30 minutes, whereby the surface thereof is made rough. The product thus obtained is mounted fixedly in an area near an exhaust opening of an internal combustion engine E as shown in FIG. 12. This is subjected to a HC purification test according to a test on a chassis of the LA-4 of American Federal Testing Procedure for Light Duty Vehicles, and as a result a HC purification rate of 37% has been confirmed.

For comparison purpose, the SUS 347 composition was prepared as to have the same composition as described in the foregoing U.S. patent specification and was formed into the same construction as that of the foregoing catalyzer of this invention, and was subjected to the same test as above, resulting in a confirmed HC purification rate of 9%. It is recognized that this does not meet the Federal Exhaust Emission Standard for 1980 and Later Model Year New Motor Cycles.

Such a noble metal series type catalyzer where a conventional honeycomb carrier is coated with Pt or Pd was prepared and formed into almost the same construction as above, and was subjected to the same test as above, which resulted in a HC purification rate of 42%. It can be said from the above that the catalyzer of the present invention exhibits similar good purification abilities to that of the noble metal series type catalyzer.

Additionally, after carrying out a durability test on an engine table for 100 hours under full open throttle conditions under the foregoing arrangement as shown in FIG. 12, a HC purifying test was carried out in almost the same testing manner as above. As a result, the catalyzer of this invention showed a 38% purification rate while the noble metal series type catalyzer purification rate was 22% under the same conditions. It can be said from these results that the catalyzer of this invention is superior in durability to the noble metal series type catalyzer and its useful like can be prolonged. It can be appreciated that this invention provides a catalyzer excellent in practical use.

EXAMPLE 2

A plate having an alloy of 50% Ni-50% Co is formed to have almost the same construction as in Example 1, and almost the same test is carried out, and as a result a HC purification rate of 40% was obtained.

EXAMPLE 3

A plate having an alloy of 40% Ni-50% Co-10% Cr is used in almost the same manner as in Example 1, and as a result a HC purification rate of 35% was obtained.

The relation between the purification rate obtained by the LA-4 test in the foregoing examples and the purification rate obtained by the catalyzer activation test apparatus is shown in FIG. 14. Namely, the purification rate of 40% by the LA-4 test corresponds to above the purification rate of 50% by the catalyzer activation test at 600° C.

Thus, according to this invention, the binary alloy of Ni-Co or the ternary alloy of Ni-Co-Cr or Ni-Co-Cu is constructed to have any composition within the range as previously described, so that an oxidizing catalyzer which is high in purification rate for CO and HC is obtained. The catalyzer of the present invention is better in durability than the conventional catalyzer, and additionally it can be improved in its oxidation preventing properties if a small amount of any kind of the additive metals such as Al, Si and others are included therein.

We claim:

1. An oxidizing catalyst comprising a ternary alloy consisting essentially of 70–45% Ni, 30–55% Co and 0.5–10% Cr.

2. An oxidizing catalyst according to claim 1, wherein the alloy contains 0.5–3.5% of at least one element selected from the group consisting of Al, Si, Nb, Ti, Be and Rare Earth elements.

3. An oxidizing catalyst which comprises a ternary alloy consisting essentially of Ni-Co-Cu with a composition of 25–75% Ni, 25–60% Co and Cu $\leq$ 50%, within the range encompassed by area $a$ as shown in the diagram of triangular coordinates in FIG. 6.

4. An oxidizing catalyst which comprises a ternary alloy consisting essentially of Ni-Co-Cu having any composition within a range encompassed by points A, B, C, D, E, F, G and H as shown in the diagram of triangular coordinates in FIG. 6.

5. An oxidizing catalyst according to claim 3, wherein the ternary alloy contains 0.5–3.5% of at least one element selected from a group consisting of Al, Si, Nb, Ti, Be and Rare Earth elements.

* * * * *